United States Patent [19]

Gosling

[11] Patent Number: 5,927,685
[45] Date of Patent: Jul. 27, 1999

[54] SEALING DEVICE FOR A VALVE STEM OF A VALVE

[75] Inventor: Frank Gosling, Ontario, Canada

[73] Assignee: JVP, Inc., Nassau, Bahamas

[21] Appl. No.: 09/039,740

[22] Filed: Mar. 16, 1998

[51] Int. Cl.[6] .............................. F16K 41/06; F16J 15/24
[52] U.S. Cl. .............. 251/214; 251/315.12; 251/315.13; 277/522; 277/526; 73/46; 137/312; 137/557
[58] Field of Search ............................... 251/214, 315.11, 251/315.12, 315.13; 277/520, 522, 525, 526; 137/312, 557; 73/46

[56] References Cited

U.S. PATENT DOCUMENTS

| | | | |
|---|---|---|---|
| 3,239,191 | 3/1966 | Widera | 251/214 |
| 3,458,172 | 7/1969 | Burrows | 251/214 |
| 3,954,251 | 5/1976 | Callahan, Jr. et al. | 251/214 |
| 4,538,790 | 9/1985 | Williams et al. | 251/214 |
| 4,558,874 | 12/1985 | Williams et al. | 251/214 |
| 4,762,301 | 8/1988 | Wozniak et al. | 251/214 |
| 5,064,167 | 11/1991 | Dipalma | 251/214 |
| 5,263,682 | 11/1993 | Covert et al. | 251/214 |
| 5,345,812 | 9/1994 | Haboian | 137/312 |
| 5,460,351 | 10/1995 | Holloway | 251/214 |

*Primary Examiner*—George L. Walton
*Attorney, Agent, or Firm*—Kolisch Hartwell Dickinson McCormack & Heuser

[57] ABSTRACT

A valve includes a column having an outer end portion defining a threaded bore, an outer mediate portion defining a first receiving recess communicating with the threaded bore, an inner mediate portion defining a passage communicating with the first receiving recess, and an inner end portion extending outwardly from a valve body and defining a second receiving recess communicating with the passage, and a valve stem having a first end portion formed with an outer thread, and a second end portion extending through the passage and formed with an annular flange received in the second receiving recess. A sealing device includes a primary set packing received in the first receiving recess, a secondary seal received in the second receiving recess and urged on the annular flange, a gland nut formed with an outer thread fixedly engaged in the threaded bore, a first biasing member mounted between the primary set packing and the gland nut, a lock nut fixedly mounted on the outer thread of the valve stem, and a second biasing member mounted between the gland nut and the lock nut.

8 Claims, 5 Drawing Sheets

5,927,685

SEALING DEVICE FOR A VALVE STEM OF A VALVE

FIELD OF THE INVENTION

The present invention relates to a sealing device, and more particularly to a sealing device for a valve stem of a valve.

BACKGROUND OF THE INVENTION

A conventional sealing device for a valve stem of a valve is shown in FIGS. 4 and 5, and a complete illustration will follow in the detailed description of the preferred embodiments.

The present invention has arisen to mitigate and/or obviate the disadvantage of the conventional sealing device.

SUMMARY OF THE INVENTION

In accordance with one aspect of the present invention, there is provided with a valve comprising a valve body, a column extending outwardly from the valve body and including an outer end portion defining a threaded bore, an outer mediate portion defining a first receiving recess communicating with the threaded bore, an inner mediate portion defining a passage communicating with the first receiving recess, and an inner end portion extending outwardly from the valve body and defining a second receiving recess communicating with the passage, and a valve stem rotatably mounted in the column and including a first end portion extending outward of the outer end portion of the column and formed with an outer thread, and a second end portion extending through the passage and formed with an annular flange received in the second receiving recess.

A sealing device comprises a primary set packing mounted around the valve stem and received in the first receiving recess, a secondary seal mounted around the valve stem while being received in the second receiving recess, and urged on the annular flange, a gland nut mounted around the valve stem and formed with an outer thread fixedly engaged in the threaded bore, a first biasing member mounted between the primary set packing and the gland nut, a lock nut fixedly mounted on the outer thread of the valve stem and located adjacent to the gland nut, and a second biasing member mounted between the gland nut and the lock nut.

Further features of the present invention will become apparent from a careful reading of the detailed description with appropriate reference to the accompanying drawings.

DETAILED DESCRIPTION OF THE PREFERRED EMBODIMENTS

Figure 4:
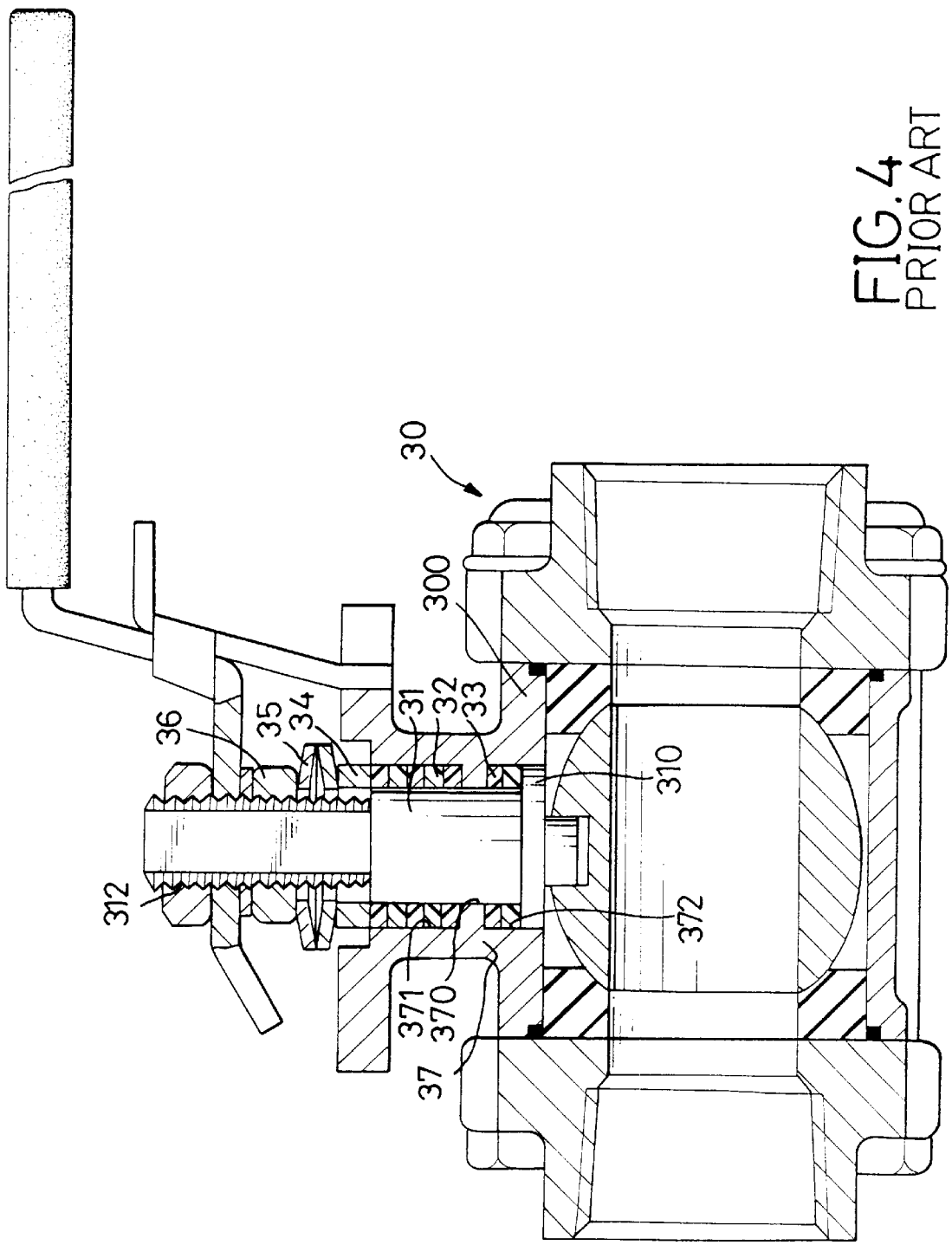
FIG. 4 is a front plan cross-sectional assembly view of a conventional sealing device for a valve according to the prior art.
Figure 5:
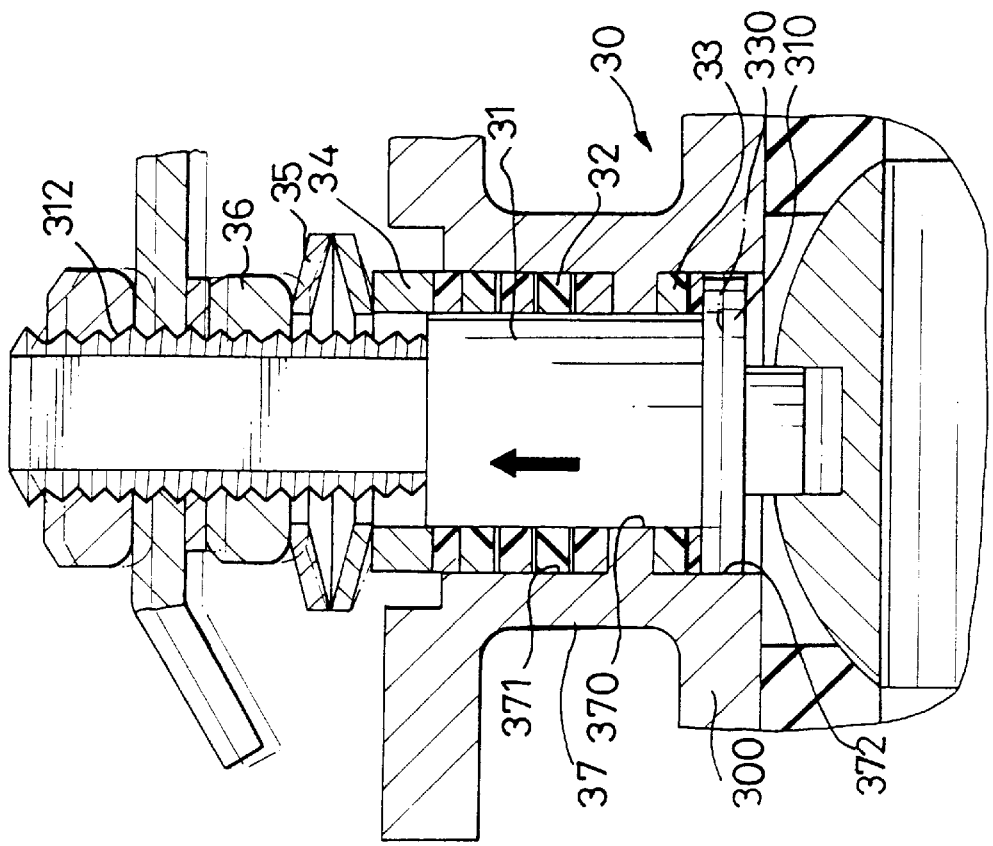
FIG. 5 is an operational view of FIG. 4.

For a better understanding of features and benefits of the present invention, reference is now made to FIGS. 4 and 5, illustrating a conventional sealing device for a valve 30 in accordance with the prior art.

The valve 30 comprises a column 37 extending outwardly from a hollow valve body 300 and including an outer end portion defining a first receiving recess 371, a mediate portion defining a passage 370 communicating with the first receiving recess 371, and an inner end portion extending from the valve body 300 and defining a second receiving recess 372 communicating with the passage 370.

A valve stem 31 is rotatably mounted in the column 37 and includes a first end portion formed with a threaded rod 312, and a second end portion extending through the passage 370 and formed with an annular flange 310 received in the second receiving recess 372.

The sealing device comprises a first seal 32 received in the first receiving recess 371, a second seal 33 received in the second receiving recess 372 and urged on the annular flange 310, a thrust washer 34 mounted around the threaded rod 312 and abutting on the first seal 32, a pair of disk springs 35 mounted around the threaded rod 312 and abutting on the thrust washer 34, and a lock nut 36 fixedly mounted on the threaded rod 312 and urged on the disk springs 35.

In operation, referring now to FIG. 5 with reference to FIG. 4, the second seal 33 tends to become worn out during long-term utilization due to a friction force acting between the second seal 33 and the annular flange 310, thereby forming a gap 330 therebetween.

The threaded rod 312 of the valve stem 31 together with the lock nut 36 can then be pushed upwardly from a first position as shown in phantom lines to a second position as shown in solid lines by means of the tension of the disk springs 35, thereby in turn moving the annular flange 310 upwardly from a first position as shown in phantom lines to a second position as shown in solid lines.

In such a situation, the first seal 32 and the second seal 33 cannot provide an efficient sealing effect between the valve stem 31 and the column 37 due to the upward movement of the valve stem 31 such that gas or liquid passing through the valve body 300 of the valve 30 tends to leak via the first seal 32 and the second seal 33.

Figure 1:
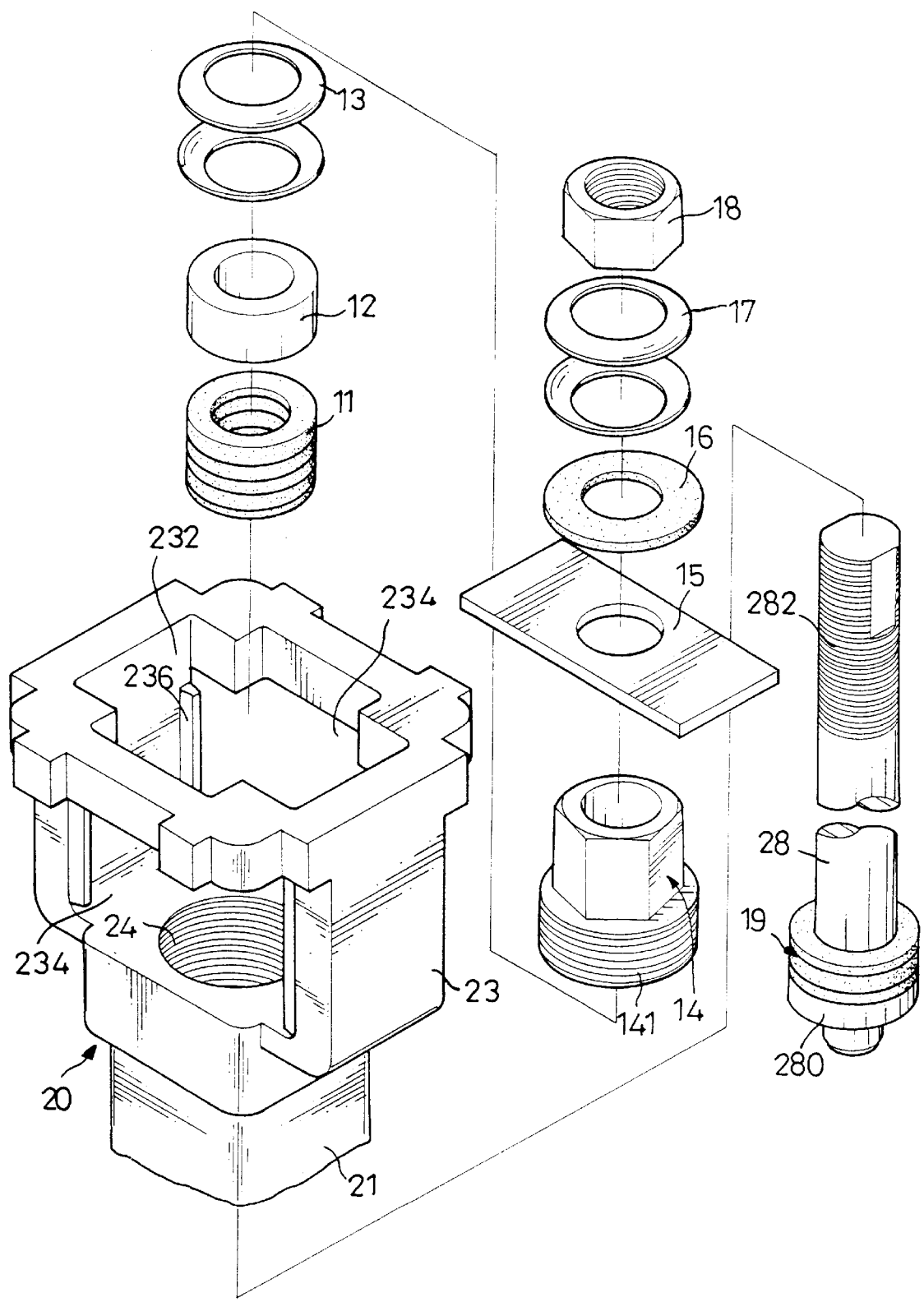
FIG. 1 is a partially exploded view of a sealing device for a valve according to the present invention.
Figure 2:
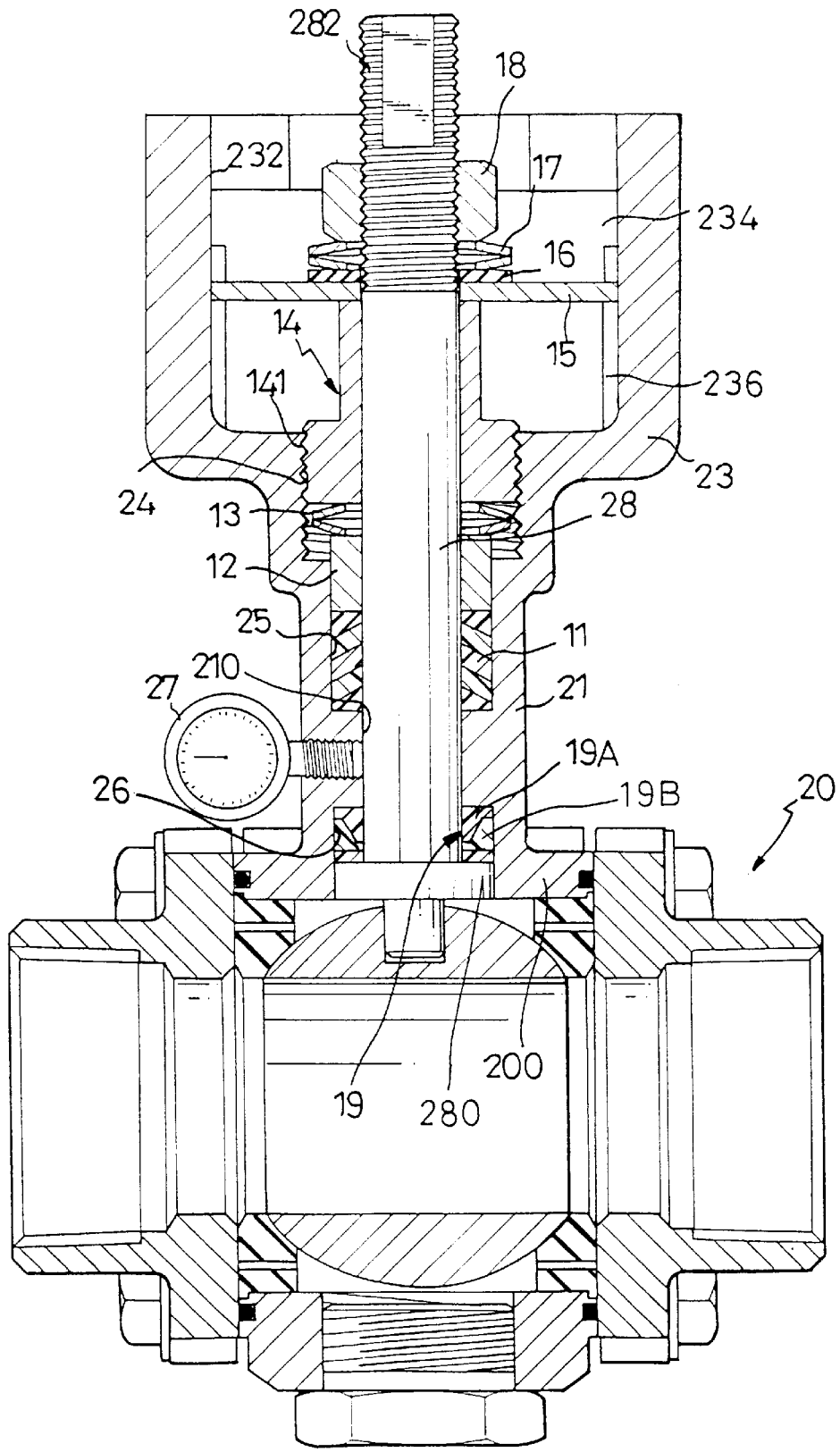
FIG. 2 is a front plan cross-sectional assembly view of a sealing device for a valve according to the present invention.

Referring now to FIGS. 1 and 2, a sealing device in accordance with the present invention can be adapted for a ball valve 20 which comprises a hollow valve body 200, and a column 21 extending outwardly from the valve body 200 and including an outer end portion defining a threaded bore 24, an outer mediate portion defining a first receiving recess 25 communicating with the threaded bore 24, an inner mediate portion defining a passage 210 communicating with the first receiving recess 25, and an inner end portion extending outwardly from the valve body 200 and defining a second receiving recess 26 communicating with the passage 210.

The first receiving recess 25 has a diameter greater than that of the passage 210, and the second receiving recess 26 has a diameter greater than that of the passage 210.

A valve stem 28 is rotatably mounted in the column 21 and includes a first end portion extending outward of the outer end portion of the column 21 and formed with an outer thread 282, and a second end portion extending through the passage 210 and formed with an annular flange 280 received in the second receiving recess 26.

The sealing device comprises a primary set packing 11 mounted around the valve stem 28 and received in the first receiving recess 25. A secondary seal 19 received in the second receiving recess 26 is mounted around the valve stem 28, and is urged on the annular flange 280.

A gland nut 14 is mounted around the valve stem 28 and is formed with an outer thread 141 which is fixedly engaged in the threaded bore 24.

A first biasing member is mounted between the primary set packing 11 and the gland nut 14 and includes a packing follower 12 mounted around the valve stem 28 and abutting on the primary set packing 11, and a pair of first disk springs 13 mounted around the valve stem 28 and urged between the packing follower 12 and the gland nut 14.

A second biasing member is mounted between the gland nut 14 and the lock nut 18 and includes a rectangular washer 15 mounted around the valve stem 28 and abutting on the gland nut 14, a thrust washer 16 mounted around the valve stem 28 and abutting on the rectangular washer 15, and a pair of second disk springs 17 mounted around the valve stem 28 and urged between the thrust washer 16 and the lock nut 18 which is fixedly mounted on the outer thread 282 of the valve stem 28.

The column 21 further includes an extension frame 23 extending outwardly from the outer end portion thereof, a rectangular recess 232 defined in the extension frame 23 and communicating with the threaded bore 24 for receiving and retaining the rectangular washer 15. The extension frame 23 includes two open side walls each transversely defining an opening 234 communicating with the rectangular recess 232, and two closed walls each formed with two limiting bars 236 for limiting the rectangular washer 15.

Figure 3:
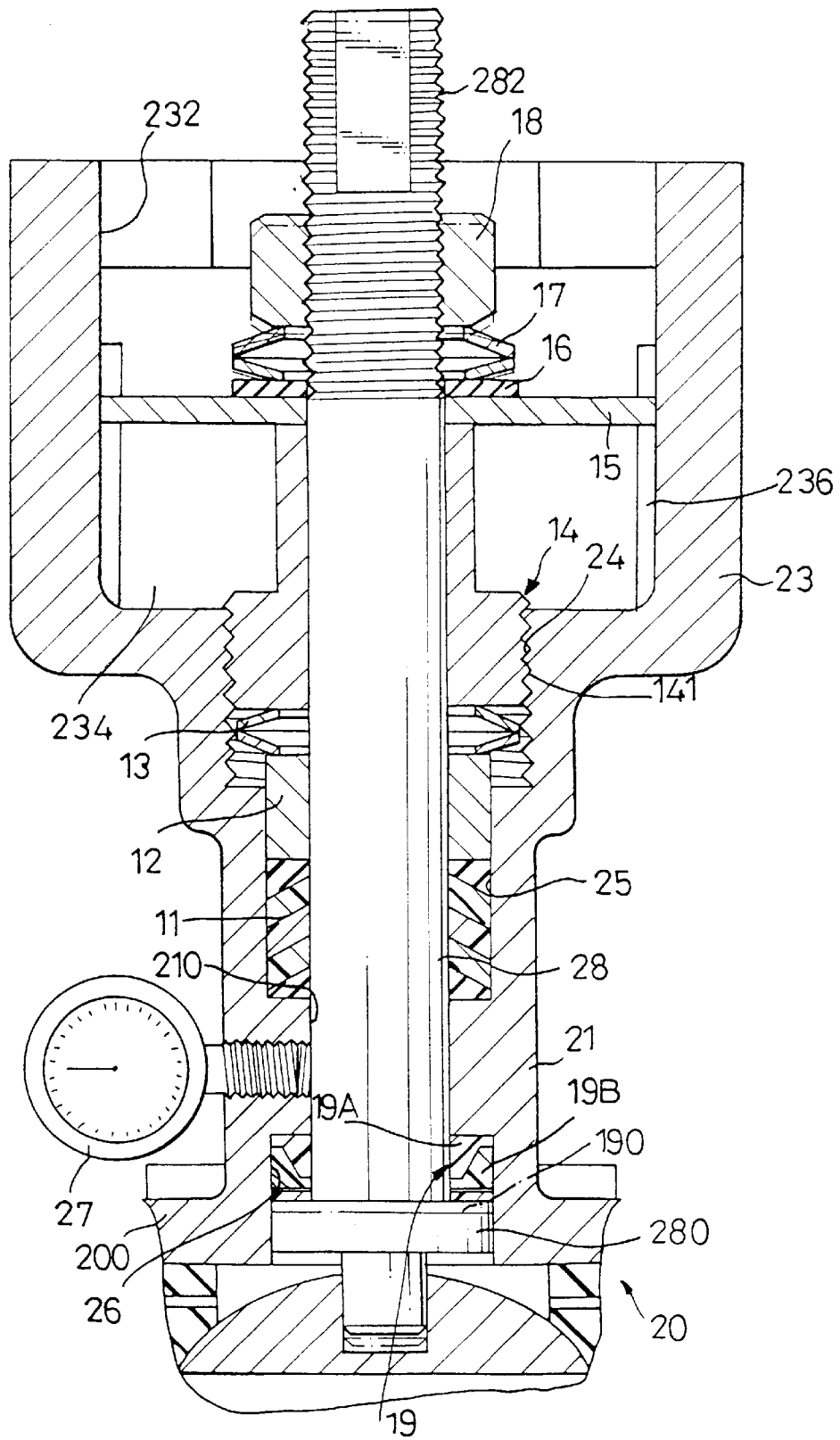
FIG. 3 is an operational view of FIG. 2.

In operation, referring now to FIG. 3 with reference to FIGS. 1 and 2, the secondary seal 19 tends to become worn out during long-term utilization due to a friction force acting between the secondary seal 19 and the annular flange 280, thereby forming a gap 190 therebetween.

The first end portion of the valve stem 28 together with the lock nut 18 can then be pushed upwardly from a first position as shown in phantom lines to a second position as shown in solid lines by means of the tension of the second disk springs 17, thereby in turn moving the annular flange 280 upwardly from a first position as shown in phantom lines to a second position as shown in solid lines.

In such a situation, the secondary seal 19 cannot seal the annular flange 280 efficiently due to the gap 190 formed therebetween.

However, the primary set packing 11 is tightly pressed by means of the gland nut 14 and is not influenced by an upward movement of the valve stem 28 such that the primary set packing 11 can be adapted to provide an efficient sealing effect between the valve stem 28 and an inner wall of the column 21 of the valve 20 when the secondary seal 19 starts to leak.

The valve 20 further comprises a pressure indicator 27 mounted on the column 21 and located between the primary set packing 11 and the secondary seal 19. The pressure indicator 27 can be used to detect if the secondary seal 19 fails by means of measuring the pressure change in the passage 210.

It is to be noted that, by adjusting the lock nut 18 and lifting the annular flange 280, sealing of the secondary seal 19 is reestablished. Also the secondary seal 19 is preferably of the type shown in FIGS. 2 and 3, and is comprised of two parts 19A and 19B. The part 19A no longer rotates with the valve stem 28 and is served as a static seal. The second seal 33 as shown in FIGS. 4 and 5 is dynamic and wears out faster.

It should be clear to those skilled in the art that further embodiments of the present invention may be made without departing from the spirit and scope of the present invention.

What is claimed is:

1. A sealing device in combination with a valve (20) which.comprises a valve body (200), a column (21) extending outwardly from said valve body (200) and including an outer end portion defining a threaded bore (24), an outer mediate portion defining a first receiving recess (25) communicating with said threaded bore (24), an inner mediate portion defining a passage (210) communicating with said first receiving recess (25), and an inner end portion extending outwardly from said valve body (200) and defining a second receiving recess (26) communicating with said passage (210), and a valve stem (28) rotatably mounted in said column (21) and including a first end portion extending outward of said outer end portion of said column (21) and formed with an outer thread (282), and a second end portion extending through said passage (210) and formed with an annular flange (280) received in said second receiving recess (26), and said sealing device further comprising:

a primary set packing (11) mounted around said valve stem (28) and received in said first receiving recess (25);

a secondary seal (19) mounted around said valve stem (28), received in said second receiving recess (26), and urged on said annular flange (280);

a gland nut (14) mounted around said valve stem (28) and formed with an outer thread (141) fixedly engaged in said threaded bore (24);

a first biasing member mounted between said primary set packing (11) and said gland nut (14);

a lock nut (18) fixedly mounted on said outer thread (282) of said valve stem (28) and located adjacent to said gland nut (14); and a second biasing member mounted between said gland nut (14) and said lock nut (18).

2. The sealing device according to claim 1, wherein said first receiving recess (25) has a diameter greater than that of said passage (210).

3. The sealing device according to claim 1, wherein said second receiving recess (26) has a diameter greater than that of said passage (210).

4. The sealing device according to claim 1, wherein said first biasing member includes a packing follower (12) mounted around said valve stem (28) and abutting on said primary set packing (11), and a pair of disk springs (13) mounted around said valve stem (28) and urged between said packing follower (12) and said gland nut (14).

5. The sealing device according to claim 1, wherein said second biasing member includes a rectangular washer (15) mounted around said valve stem (28) and abutting on said gland nut (14), a thrust washer (16) mounted around said valve stem (28) and abutting on said rectangular washer (15), and a pair of disk springs (17) mounted around said valve stem (28) and urged between said thrust washer (16) and said lock nut (18).

6. The sealing device according to claim 5, wherein said column (21) further includes an extension frame (23) extending outwardly from said outer end portion thereof, a rectangular recess (232) defined in said extension frame (23) and communicating with said threaded bore (24) for receiving and retaining said rectangular washer (15).

7. The sealing device according to claim 6, wherein said extension frame (23) includes two open side walls each transversely defining an opening (234) communicating with said rectangular recess (232) and two closed side walls each formed with two limiting bars (236) for limiting said rectangular washer (15).

8. The sealing device according to claim 1, wherein said valve (20) further comprises a pressure indicator (27) mounted on said column (21) and located between said primary set packing (11) and said secondary seal (19).

* * * * *